(12) United States Patent
Hughes et al.

(10) Patent No.: US 10,701,413 B2
(45) Date of Patent: Jun. 30, 2020

(54) REAL-TIME SUB-SECOND DOWNLOAD AND TRANSCODE OF A VIDEO STREAM

(71) Applicant: Disney Enterprises, Inc., Burbank, CA (US)

(72) Inventors: Natanael Hughes, Poulsbo, WA (US); Terry Paul, Seattle, WA (US); Alexander Vigdor, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/614,414

(22) Filed: Jun. 5, 2017

(65) Prior Publication Data
US 2018/0352273 A1 Dec. 6, 2018

(51) Int. Cl.
| | |
|---|---|
| *H04N 5/445* | (2011.01) |
| *H04N 21/2343* | (2011.01) |
| *G06F 16/74* | (2019.01) |
| *H04N 21/845* | (2011.01) |
| *H04N 21/482* | (2011.01) |
| *H04N 21/241* | (2011.01) |

(52) U.S. Cl.
CPC ... *H04N 21/234309* (2013.01); *G06F 16/743* (2019.01); *H04N 21/241* (2013.01); *H04N 21/4828* (2013.01); *H04N 21/8456* (2013.01)

(58) Field of Classification Search
CPC .. H04N 21/812; H04N 21/814; H04N 21/235; H04N 21/8146; H04N 21/4532; H04N 21/44222; H04N 21/25891
USPC .............................. 725/51–54; 709/217–232
See application file for complete search history.

(56) References Cited

U.S. PATENT DOCUMENTS

| | | | |
|---|---|---|---|
| 9,380,092 B2 * | 6/2016 | Patel | H04L 65/60 |
| 2007/0250901 A1 * | 10/2007 | McIntire | H04N 7/17318 725/146 |
| 2009/0125510 A1 * | 5/2009 | Graham | G06Q 30/02 |
| 2009/0138906 A1 * | 5/2009 | Eide | G06Q 30/0264 725/32 |
| 2011/0231520 A1 * | 9/2011 | Ha | H04N 21/23439 709/219 |
| 2011/0282906 A1 * | 11/2011 | Wong | G06F 17/30831 707/780 |
| 2011/0289460 A1 * | 11/2011 | Dow | G06F 17/3002 715/854 |
| 2012/0060095 A1 * | 3/2012 | Klappert | H04N 21/458 715/722 |
| 2012/0166435 A1 * | 6/2012 | Graham | G06K 9/00463 707/728 |

(Continued)

Primary Examiner — Annan Q Shang
(74) Attorney, Agent, or Firm — Farjami & Farjami LLP

(57) ABSTRACT

There is provided a system having a content server having a hardware processor and a system memory, a content management software code stored in the system memory. The hardware processor being configured to execute the content management software code to receive a search request for a video content, and identify a plurality of video content streams based on the search request. For each of the plurality of video content streams to determine a plurality of video content threads for downloading the video content stream in multiple segments, execute the plurality of video content threads concurrently at least in part for downloading the video content stream, and reassemble the video content stream from the plurality of video content threads.

20 Claims, 4 Drawing Sheets

(56) References Cited

U.S. PATENT DOCUMENTS

| | | | |
|---|---|---|---|
| 2012/0236201 A1* | 9/2012 | Larsen | G06Q 10/10 348/468 |
| 2012/0278824 A1* | 11/2012 | Patil | G06F 17/3002 725/13 |
| 2013/0011121 A1* | 1/2013 | Forsyth | G11B 27/034 386/245 |
| 2014/0282118 A1* | 9/2014 | Kumamoto | G06F 16/95 715/760 |
| 2015/0095366 A1* | 4/2015 | Mo | H04N 21/25891 707/769 |
| 2015/0134651 A1* | 5/2015 | Holzer | G06F 16/5838 707/723 |
| 2015/0181301 A1* | 6/2015 | Bloch | H04N 21/47217 725/41 |
| 2015/0201023 A1* | 7/2015 | Kotab | H04L 65/60 709/208 |
| 2015/0288732 A1* | 10/2015 | Phillips | H04L 65/60 709/219 |
| 2015/0296228 A1* | 10/2015 | Chen | G06F 17/30029 725/34 |
| 2016/0205431 A1* | 7/2016 | Avedissian | G06F 3/0481 725/37 |
| 2016/0277802 A1* | 9/2016 | Bernstein | H04N 21/4325 |
| 2017/0270128 A1* | 9/2017 | Smith | A63F 13/25 |
| 2017/0308552 A1* | 10/2017 | Soni | G06F 16/54 |

* cited by examiner

REAL-TIME SUB-SECOND DOWNLOAD AND TRANSCODE OF A VIDEO STREAM

BACKGROUND

Streaming video content is an ever-increasing trend among media distribution and digital video asset management applications. In order to capitalize on these trends, media applications need to present video content to consumers in an efficient and interesting manner by providing interactive searching and sorting functions. Providing engaging, interactive, and dynamic interfaces drives and retains consumer interest and enjoyment. For example, many streaming media applications utilize thumbnail images in order to capture and maintain interest.

Conventional solutions require pre-generation and storage of thumbnail images for future use, which also require thousands of images to be pre-generated per digital media content. However, such solutions lack flexibility and scalability due to resource costs associated with pre-generating and storing ever-increasing volumes of thumbnail images.

SUMMARY

There are provided systems and methods for performing real-time sub-second download and transcode of a video stream, substantially as shown in and/or described in connection with at least one of the figures, and as set forth more completely in the claims.

DETAILED DESCRIPTION

Figure 1:
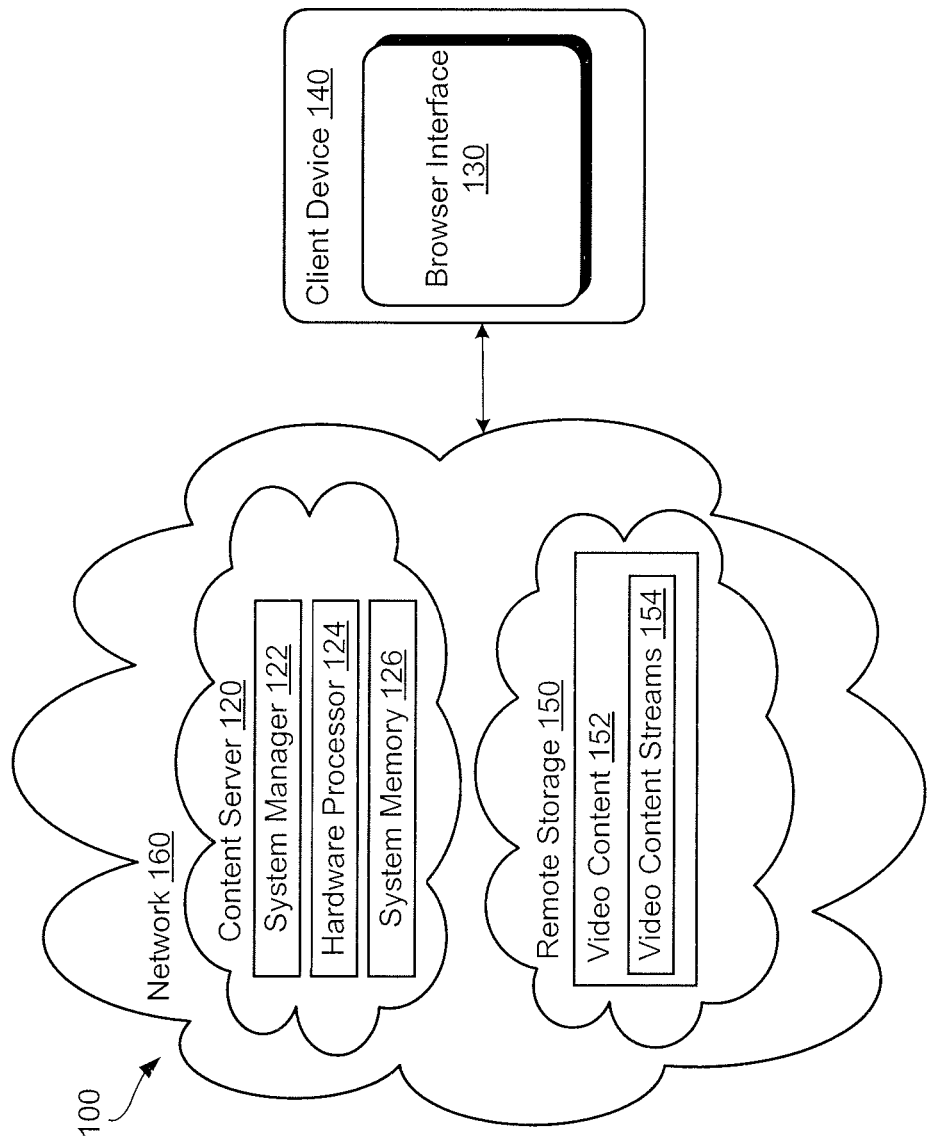
FIG. 1 shows an exemplary system for performing real-time sub-second download and transcode of a video stream, according to one implementation of the present disclosure.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows exemplary system 100 for performing real-time sub-second download and transcode of a video stream. System 100 is shown to include content server 120, browser interface 130, client device 140, remote storage 150, and network 160. As shown in FIG. 1, network 160 includes content server 120 and remote storage 150. Browser interface 130 is in communication with content server 120 via client device 140 and network 160. Content server 120 includes system manager 122 in communication with hardware processor 124 and system memory 126. Browser interface 130 is configured to access network 160, via client device 140.

In an exemplary implementation, hardware processor 124 may include a plurality of hardware processors implemented across multiple blade servers of an information handling system (IHS). Analogously, system memory 126 may include multiple memory devices implemented via an IHS. In one exemplary implementation, system memory 126 may include a non-transitory computer readable medium configured to store processor executable instructions, for example, ROM, RAM, EEPROM, or other non-transitory computer-readable medium configured to store processor executable instructions.

Content server 120 may include a WAN/LAN networked computer system capable of communication with the Internet via wireless or connected communication, e.g. Ethernet hybrid fiber optic cabling system, for communicating with remote storage 150 and network 160. In another exemplary implementation, discussed in further detail below, system manager 122 may be implemented as a virtual manager controlling virtual resources (not shown in FIG. 1), and content server 120 may be implemented as a distributed virtualized server managing multiple virtual resources across multiple computing nodes.

As shown in FIG. 1, remote storage 150 may be configured to store video content 152. As used herein the term "video content" refers to any information including audio, video, data, images, text, plots, storylines, lyrics, or other digital content that can be configured for human perception. Video content 152 may include a file of digital information or a stream of digital data. In an exemplary implementation, video content 152 includes video content streams 154; video content streams 154 may include digital information sent as a stream of digital data, as is well-known in the art.

Discussed in further detail below, content server 120 may be configured to request real-time access in response to receiving a search request for video content 152. In an exemplary implementation, remote storage 150 may be configured for providing content server 120 real-time access to video content 152. In yet another exemplary implementation, remote storage 150 may be part of a Software as a Service (SAAS) provider's cloud storage service, e.g. an Amazon AWS S3 Bucket.

Figure 2:
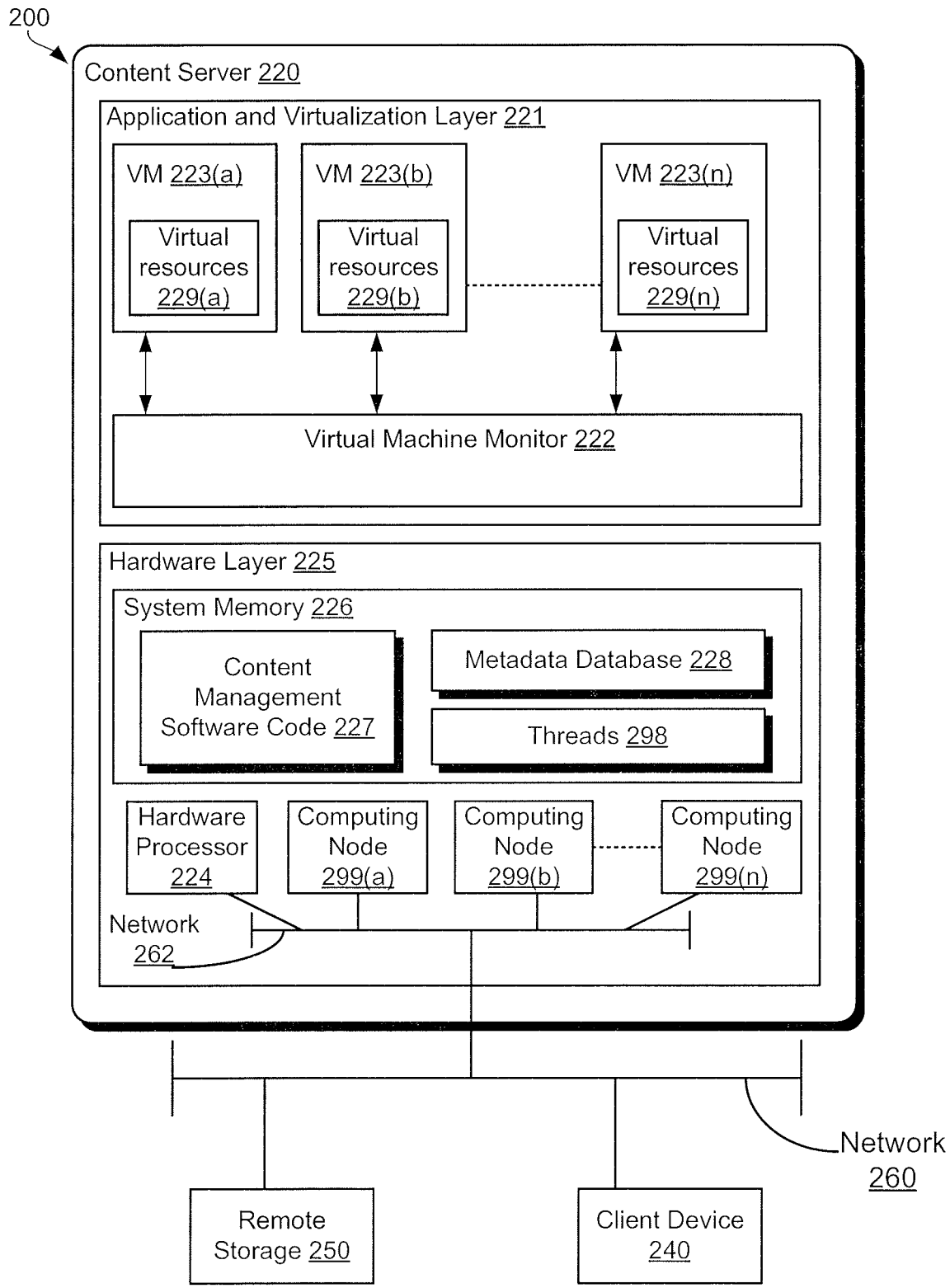
FIG. 2 shows an exemplary content server of the system of FIG. 1, according to one implementation of the present disclosure.

Now referring to FIG. 2, FIG. 2 shows content server 220 of real-time sub-second download system 200, which is an exemplary implementation of real-time sub-second download system 100 of FIG. 1, wherein similar labels correspond to similar structure having similar operation. As shown FIG. 2, real-time sub-second download system 200 also includes remote storage 250, and client device 240 having browser interface 130 (browser interface 130 not shown in FIG. 2). Content server 220 may be configured to communicate with remote storage 250 and client device 240 via network 260.

In a particular implementation, content server 220 includes application and virtualization layer 221 and hardware layer 225. In another exemplary implementation, content server 220 may be organized according to the well-known 7-layer virtualization model. Other level schemes and virtualization hierarchy may be implemented without diverting from the scope of the present implementation.

As shown in FIG. 2, application and virtualization layer 221 may include virtual machines 223(a), and 223(b) through 223(n) (hereinafter "virtual machines 223(a)-

223(n)"), and Virtual Machine Monitor (VMM) 222. Virtual machines 223(a)-223(n), each include respective virtual resources 229(a), and 229(b) through 229(n) (hereinafter "virtual resources 229(a)-229(n)"). Virtual machines 223(a)-223(n) are in communication with VMM 222. VMM 222 may be configured to access and control hardware layer 225 for utilizing hardware processor 224 and system memory 226 including metadata database 228, content management software code 227, and threads 298. As discussed in further detail below, in an exemplary implementation VMM 222 and virtual machines 223(a)-223(n) may be configured for simultaneous parallel thread execution utilizing threads 298 and computing nodes 299(a), and 299(b) through 299(n) (hereinafter "computing nodes 299(a)-299(n)"). In an exemplary implementation, computing nodes 299(a)-299(n) may comprise a plurality of hardware processors implemented via an IHS.

As shown in FIG. 2, hardware layer 225 includes hardware processor 224, computing nodes 299(a)-299(n), and system memory 226 having metadata database 228, threads 298, and content management software code 227 stored thereon. Hardware layer 225 may be configured for inter-network communication via local network 262. In a particular implementation, local network 262 includes a WAN/LAN network configured to facilitate communication between hardware processor 224 and computing nodes 299(a)-299(n).

As discussed above, content server 220 may be implemented as a virtual computing platform, which provides translating interconnected physical resources such as computing nodes 299(a)-299(n) into virtual resources, i.e. virtual resources 229(a)-229(n). Virtual resources 229(a)-229(n) may be contained in virtual partitions assembled into virtual servers, i.e. virtual machines 223(a)-223(n). Each of the virtual machines 223(a)-223(n) may execute a guest operating system (not shown). VMM 222, utilizing content management software code 227, manages and controls the mapping of physical and virtual resources.

In a particular implementation, content management software code 227 includes management capability for task and resource management. Task and resource management may include load balancing based on resource policies set by a server administrator (not shown in FIG. 2). To this extent, content management software code 227 may be configured to implement task and resource management by considering available resources versus demand for resources on content server 220 based on a resource policy.

Figure 3:
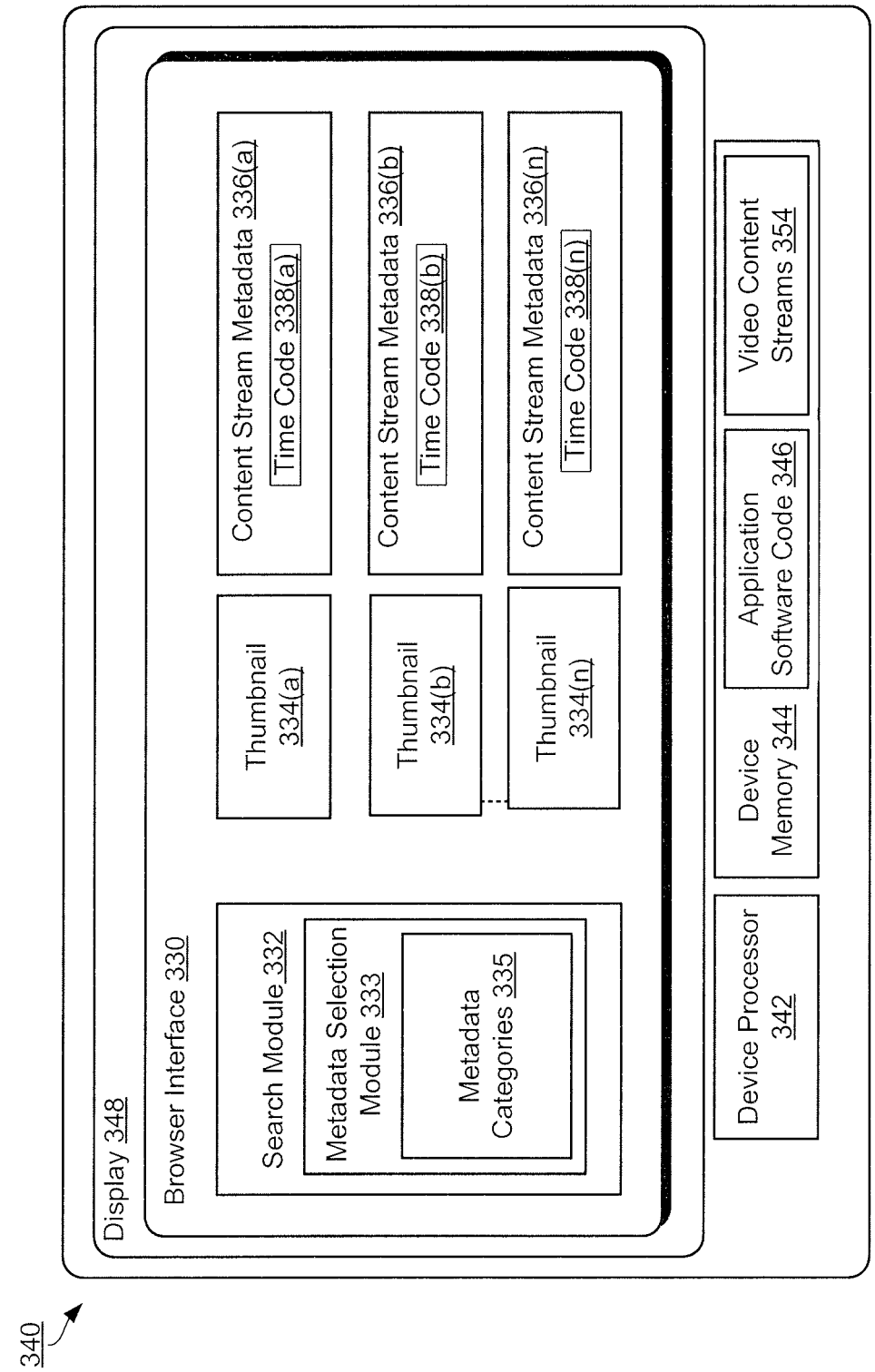
FIG. 3 shows an exemplary client device of the system of FIG. 1, according to one implementation of the present disclosure.

Now referring to FIG. 3, FIG. 3 shows client device 340 utilizing browser interface 330, which is an exemplary implementation of client device 140, 240 of FIGS. 1 and 2, and browser interface 130 of FIG. 1, respectively, wherein similar labels correspond to similar structure having similar operation. As shown in FIG. 3, browser interface 130, 330 may be configured for access via client device 140, 240, 340 and display 348. Client device 140, 240, 340 includes device processor 342, device memory 344 having application software code 346 and video content streams 154, 354 stored thereon. Device processor 342 may be implemented as a hardware processor and configured to execute application software code 346 for implementing the exemplary implementations as described herein. Device memory 344 may be implemented as ROM, RAM, EEPROM, or any other type of non-transitory computer readable medium capable of storing processor executable instructions.

In an exemplary implementation, browser interface 130, 330 may be configured to communicate search requests, input via search module 332, to content server 120, 220. A user (not shown) of real-time sub-second download system 100, 200 may input search requests related to video content 152. For example, search requests may include keywords or search tags related to video content 152 of interest to the user. As shown in FIG. 3, browser interface 130, 330 is configured to display, via display 348, content stream metadata 336(a), and 336(b) through 336(n) (hereinafter "content stream metadata 336(a)-336(n)"), and video thumbnails 334(a), and 334(b) through 334(n) (hereinafter "video thumbnails 334(a)-334(n)") related to search requests input by the user. Video thumbnails 334(a)-334(n) may be generated by content server 120, 220 dynamically in real-time, in response to receiving the search request from client device 140, 240, 340. In response to receiving video thumbnails 334(a)-334(n) from content server 120, 220, application software code 346 may be configured to cause displaying video thumbnails 334(a)-334(n) via display 348.

Browser interface 130, 330, includes search module 332 having metadata selection module 333, which provides interactive searching functionality for sorting, searching, and selecting video content streams 154, 354. Interactive searching functionality of metadata selection module 333 may include metadata categories 335. In an exemplary implementation, metadata categories 335 may include at least one or more of: channel, series, season, episode, characters, activities, events, and locations. A user (not shown) may select one or more metadata categories 335 via metadata selection module 333, which in turn causes displaying content stream metadata 336(a)-336(n). Selecting a different set of one or more metadata categories 335 may cause displaying different content stream metadata 336(a)-336(n). In an exemplary implementation, content stream metadata 336(a)-336(n) may include time codes 338(a), and 338(b) through 338(n) (hereinafter "time codes 338(a)-338(n)"), respectively. Time codes 338(a)-338(n) may each correspond to a location (not shown) in a respective one of video content streams 154, 354 corresponding to a particular search request, which is discussed in further detail below.

In another exemplary implementation, browser interface 130, 330 may be configured for allowing exposure to any other developer to direct content server 120, 220 to any other storage location in order to retrieve video content 152, e.g. via a URL address (not shown). In an exemplary implementation, in response to receiving a URL address, content server 120, 220 may be configured to retrieve video content 152 related to the URL address. In yet another exemplary implementation, the URL may include height and width aspect ratio parameters corresponding to thumbnails 334(a)-334(n) and time codes 338(a)-338(n).

Figure 4:
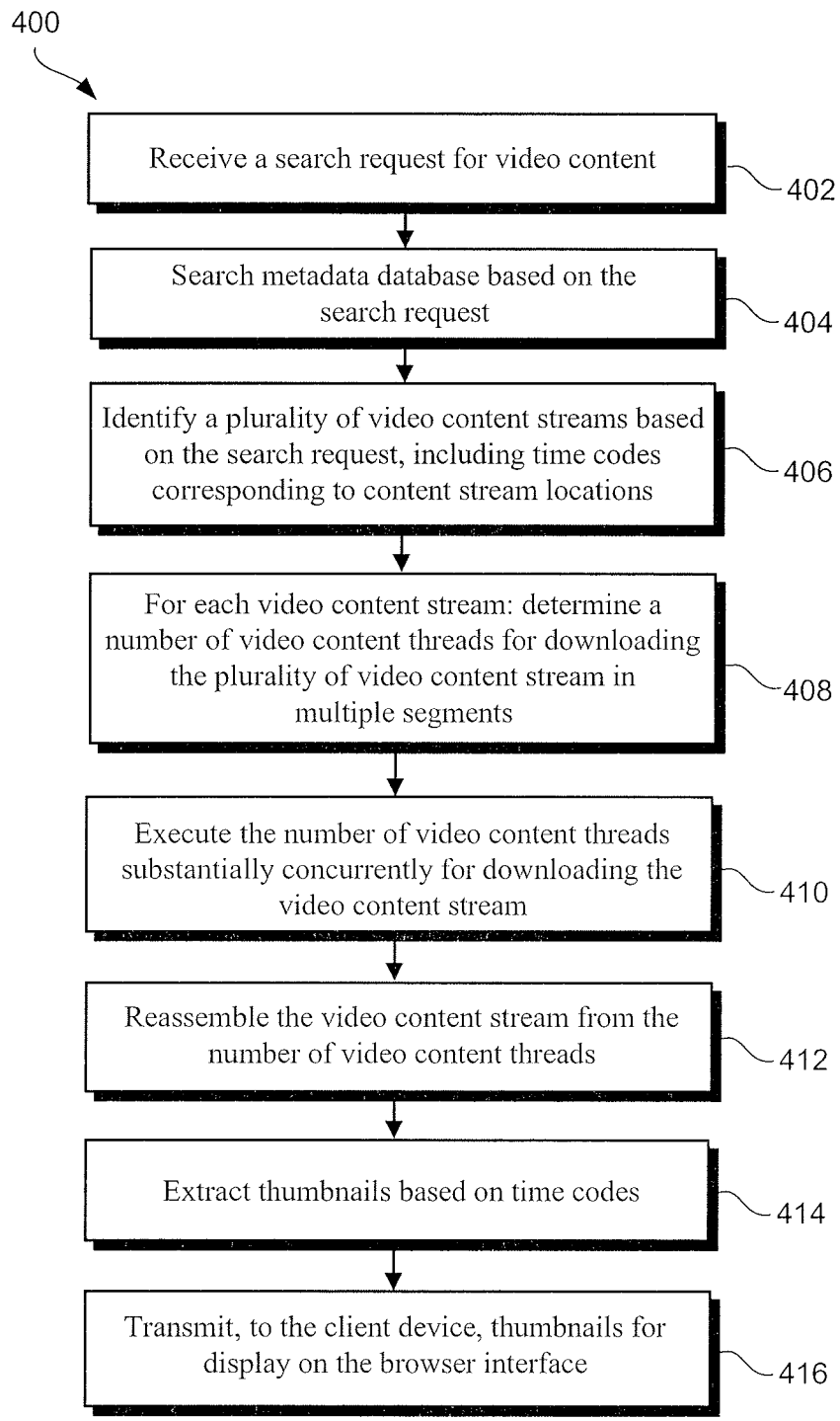
FIG. 4 shows a flowchart of an exemplary method for performing real-time sub-second download and transcode of a video stream in the system of FIG. 1, according to one implementation of the present disclosure.

Turning to FIG. 4, FIG. 4 shows flowchart 400 presenting an exemplary method for use by real-time sub-second download system 100, 200. Flowchart 400 begins when hardware processor 124, 224 is configured to execute content management software code 227 to receive a search request for video content (action 402).

In an exemplary implementation, content server 120, 220 may receive search requests via client device 140, 240, 340, and browser interface 130, 330. A user (not shown) may input search requests by accessing browser interface 130, 330 via client device 140, 240, 340. Client device 140, 240, 340 may include a mobile device such as a smart phone, tablet computer, laptop computer, or any other computing device capable of establishing an Internet connection.

After receiving the search request as discussed above, flowchart 400 continues with hardware processor 124, 224 searching metadata database 228 based on the search request (action 404). Next, flowchart 400 continues with hardware processor 124, 224 identifying video content streams 154, 354 based on the search request, including time codes 338(*a*)-338(*n*) corresponding to content stream locations (action 406). Hardware processor 124, 224 may be configured to return time codes 338(*a*)-338(*n*) for display via browser interface 130, 330.

In an exemplary implementation, metadata database 228 includes closed caption files. Closed caption files may correspond to script or dialogue of video content streams 154, 354. In a particular implementation, after searching metadata database 228, hardware processor 124, 224 is configured to identify video content streams 154, 354 corresponding to video content 152. In another exemplary implementation, identifying video content streams 154, 354 corresponding to video content 152 includes identifying a URL location corresponding to video content 152 stored on remote storage 150, 250. In yet another exemplary implementation, metadata database 228 may include other information useful for categorizing and describing video content 152 including video content streams 154, 354.

As discussed above, time codes 338(*a*)-338(*n*) may correspond to a location in video content streams 154, 354. In an exemplary implementation, the search request may include a keyword such as the name of a character. Hardware processor 124, 224 may search the closed caption file or script corresponding to video content streams 154, 354 and return time codes 338(*a*)-338(*n*) corresponding to locations in the script that recite the keyword. In an exemplary implementation, the location is a temporal location, e.g. 6 minutes, 35 seconds, 189 microseconds.

In one exemplary implementation, the closed caption location corresponds to a temporal range within video content streams 154, 354. Because closed caption files are displayed for a predetermined amount of time, time codes 338(*a*)-338(*n*) may correspond to a range of time in which the keyword is displayed. In a particular implementation, dynamically generating thumbnails 334(*a*)-334(*n*) may include generating thumbnails 334(*a*)-334(*n*) utilizing the first frame of video corresponding to the temporal range.

Next, flowchart 400 continues with, for each of video content streams 154, 354, determining a number of video content threads 298 for downloading video content streams 154, 354 in multiple segments (action 408). In a particular implementation, determining a number of video content threads 298 may be based on gauging the size of video content streams 154, 354.

In another exemplary implementation, content management software code 227 may be configured to determine the most efficient number of video content threads 298 for dividing video content streams 154, 354 by considering both the size of video content streams 154, 354 and a predetermined optimal number of video content threads 298. The predetermined optimal number of video content threads 298 may be determined by performing testing of power consumption and execution deadlines. To this extent, the content management software code is configured to execute an efficient, low power, sub-second transcode and download of a video stream.

After determining the number of video content threads 298, flowchart 400 continues with hardware processor 124, 224 executing video content threads 298 concurrently at least in part for downloading video content streams 154, 354 (action 410). In a particular implementation, executing video content threads 298 concurrently at least in part includes utilizing parallel simultaneous distributed thread execution and management implemented by VMM 222, as discussed above.

In yet another exemplary implementation, content management software code 227 may include task and resource management software for assigning one or more video content threads 298 to multiple processing nodes, i.e. virtual machines 223(*a*)-223(*n*), based on resource policy guidelines implemented by an administrator (not shown). Task and resource management may further facilitate real-time sub-second download and transcode by allocating physical resources and mapping to virtual resources used by the virtual server, based on a resource. Thus, in a particular implementation, VMM 222 may be configured to execute video content threads 298 concurrently at least in part by assigning one or more video content threads 298 to each of virtual machines 223(*a*)-223(*n*).

In an exemplary implementation content management software code 227 may be configured to cause temporarily storing recently downloaded video content streams 154, 354, i.e. video caching, in system memory 126, 226. Video caching may further facilitate dynamic real-time sub-second transcode and download. In this implementation, when a search request relates to a previous search request, prior to executing, real-time sub-second download system 100, 200 is configured to utilize video caching by checking for previously stored video content streams 154, 354 and prevent redundant thread execution and download. In a particular implementation, a server administrator (not shown) may adjust the length of time content server 120, 220 temporarily stores video content streams 154, 354. In another exemplary implementation, prior to executing video content threads 298, hardware processor 124, 224 is further configured to execute the content management software code 227 to transcode video content streams 154, 354 into a lower resolution.

After executing video content threads 298 concurrently at least in part, flowchart 400 continues with hardware processor 124, 224 reassembling video content streams 154, 354 from video content threads 298 (action 412). In a particular implementation, reassembling may include leveraging random file access functionality of VMM 222 in order to write each video content segment corresponding to video content threads 298, in any order, e.g. write the last segment first based on completed thread execution.

Flowchart 400 continues with extracting thumbnails 334(*a*)-334(*n*) based on time codes 338(*a*)-338(*n*) (action 414). Extracting thumbnails 334(*a*)-334(*n*) may be implemented in a variety of manners, the methods of which are well known in the art and are not described in further detail herein. As discussed above, in a particular implementation, extracting thumbnails 334(*a*)-334(*n*) may be based on a temporal location or temporal range contained in time codes 338(*a*)-338(*n*), respectively.

In an exemplary implementation, real-time sub-second download system 100, 200 is configured to complete determining the number of video content threads 298, executing the plurality of video content threads 298, and reassembling video content streams 154, 354 in less than one second and without the use of specialized hardware accelerators. In yet another exemplary implementation, real-time sub-second download system 100, 200 is configured to complete determining the number of video content threads 298, executing video content threads 298, and reassembling video content streams 154, 354 in less than $1/1000$ of a second without the use of specialized hardware accelerators.

In addition to highly efficient download and transcode, real-time sub-second download system 100, 200 is configured to run on commodity hardware. Stated another way, in a particular implementation, content server 120, 200 is facilitated without the need for specialized accelerating hardware rather implemented via commodity hardware. Providing the foregoing functionalities of real-time sub-second download system 100, 200 via commodity hardware allows scalability and increased flexibility for adapting real-time sub-second download system 100, 200 to growing user demand. According to the exemplary method outlined in FIG. 4, flowchart 400 can conclude when hardware processor 124, 224 transmits, to the client device 140, 240, 340, thumbnails 334(*a*)-334(*n*) for display via browser interface 130, 330 (action 416).

In a particular implementation, the steps of a flowchart 400 herein may be encompassed via a processor-executable software module that may reside on a non-transitory computer-readable storage medium, including any media that may be accessed by a computer, for example, a non exhaustive list may comprise ROM, EEPROM, RAM, CD-ROM or other optical disk storage, magnetic disk storage or other magnetic storage devices, or any other medium that may be used to retain desired program code in the form of instructions that may be utilized by a computer. Disk, supra, includes compact disc (CD), laser disc, optical disc, digital versatile disc (DVD), floppy disk, and blu-ray disc. In another exemplary implementation, one or more of the foregoing exemplary implementations may be implemented in hardware, software, firmware, or any combination thereof. Accordingly, content management software code 137, 237 may be stored on or transmitted over as one or more computer-executable or processor-executable instructions or code on a tangible, non-transitory computer-readable or non-transitory processor-readable storage medium.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a content server having a hardware processor and a system memory;
a content management software code stored in the system memory;
the hardware processor being configured to execute the content management software code to:
receive a search request from a client device for a video content, the search request including a time code corresponding to a location within the video content;
identify a plurality of video content streams based on the search request;
for each of the plurality of video content streams:
determine a plurality of video content threads for downloading the video content stream in multiple segments;
execute the plurality of video content threads concurrently at least in part for downloading the video content stream; and
reassemble the video content stream from the plurality of video content threads;
dynamically generate in real-time, in response to and after the search request is received, a thumbnail from the location corresponding to the time code from each of the plurality of video content streams identified based on the search request; and
transmit, to the client device, the thumbnail that was dynamically generated in real-time, in response to and after the search request, for each of the plurality of video content streams.

2. The system of claim 1, wherein identifying the plurality of video content streams based on the search request comprises searching a closed caption file corresponding to a dialogue or script of a video content stream of the plurality of video content streams.

3. The system of claim 1, wherein the content server comprises a plurality of virtual machines, and wherein the hardware processor is configured to execute the content management software code to download the plurality of video content threads concurrently at least in part by assigning one or more of the plurality of video content threads to each of the plurality of virtual machines.

4. The system of claim 1, wherein the hardware processor is further configured to execute the content management software code to determine the plurality of video content threads for downloading the video content stream into multiple segments based on a size of the video content stream.

5. The system of claim 1, wherein the hardware processor is further configured to execute the content management software code to, prior to executing the plurality of video content threads, transcode the video content stream into a lower resolution.

6. The system of claim 1, wherein the search request includes a height and a width aspect ratio of the thumbnail.

7. The system of claim 1, wherein the thumbnail for each of the plurality of video content streams is not generated and not stored in the system memory prior to the search request.

8. The system of claim 1, wherein the time code is one of a temporal location or a temporal range.

9. A method for use by a system including a content server having a hardware processor and a system memory storing a content management software code, the method comprising:
receiving, using the hardware processor, a search request from a client device for a video content, the search request including a time code corresponding to a location within the video content;
identifying, using the hardware processor, a plurality of video content streams based on the search request;
for each of the plurality of video content streams:
determining a plurality of video content threads for downloading the video content stream in multiple segments;
executing the plurality of video content threads concurrently at least in part for downloading the video content stream; and
reassembling the video content stream from the plurality of video content threads;
dynamically generating in real-time, in response to and after the search request is received, a thumbnail from the location corresponding to the time code from each of the plurality of video content streams identified based on the search request; and
transmitting, to the client device, the thumbnail that was dynamically generated in real-time, in response to and after the search request, for each of the plurality of video content streams.

10. The method of claim 9, wherein the identifying comprises searching a closed caption file corresponding to a dialogue or script of a video content stream of the plurality of video content streams.

11. The method of claim 9, wherein the content server comprises a plurality of virtual machines, and wherein the executing comprises assigning one or more of the plurality of video content threads to each of the plurality of virtual machines.

12. The method of claim 9, wherein the determining is based on a size of the video content stream.

13. The method of claim 9, wherein prior to the executing, the method further comprises transcoding the video content stream into a lower resolution.

14. The method of claim 9, wherein the search request includes a height and a width aspect ratio of the thumbnail.

15. The method of claim 9, wherein the thumbnail for each of the plurality of video content streams is not generated and not stored in the system memory prior to the search request.

16. The method of claim 9, wherein the time code is one of a temporal location or a temporal range.

17. A method for use by a system including a content server having a hardware processor and a system memory storing a content management software code, the method comprising:
  receiving, using the hardware processor, a search request from a client device for a video content, the search request including a temporal range corresponding to a video frame within the video content;
  identifying, using the hardware processor, a plurality of video content streams based on the search request;
  for each of the plurality of video content streams:
    determining a plurality of video content threads for downloading the video content stream in multiple segments;
    executing the plurality of video content threads concurrently at least in part for downloading the video content stream; and
    reassembling the video content stream from the plurality of video content threads;
  dynamically generating in real-time, in response to and after the search request is received, one or more thumbnails from the video frame corresponding to the temporal range from each of the plurality of video content streams identified based on the search request; and
  transmitting, to the client device, the one or more thumbnails that were dynamically generated in real-time, in response to and after the search request, for each of the plurality of video content streams.

18. The method of claim 17, wherein the content server comprises a plurality of virtual machines, and wherein executing the plurality of video content threads concurrently comprises assigning one or more of the plurality of video content threads to each of the plurality of virtual machines.

19. The method of claim 17, wherein the plurality of video content threads are determined based on a size of the video content stream.

20. The method of claim 17, wherein the search request includes a height and a width aspect ratio of at least one of the one or more thumbnails.

* * * * *